United States Patent [19]

Gulmini

[11] Patent Number: 5,096,130
[45] Date of Patent: Mar. 17, 1992

[54] MANIPULATING AND SELECTING UNIT FOR RECYCLING PRESSED OR UNPRESSED BODIES OBTAINED FROM PLASTIC MATERIAL CONTAINERS OR OTHERS

[75] Inventor: Carlo Gulmini, Casumaro, Italy

[73] Assignee: Govoni SpA, Casumaro, Italy

[21] Appl. No.: 500,784

[22] Filed: Mar. 28, 1990

[30] Foreign Application Priority Data

Mar. 28, 1989 [EP] European Pat. Off. ........ 89830135.3

[51] Int. Cl.⁵ ............................................. B02C 13/00
[52] U.S. Cl. ......................................... 241/81; 241/99;
241/DIG. 38; 241/101.4; 209/540; 209/567
[58] Field of Search ............... 241/34, 79, 81, 89,
241/152 A, DIG. 38, 101.4; 209/540, 545, 562,
567, 580; 198/471.1, 602

[56] References Cited

U.S. PATENT DOCUMENTS

| | | | |
|---|---|---|---|
| 3,228,520 | 1/1966 | Schneider | 209/580 X |
| 3,563,377 | 2/1971 | Southcott | 209/545 X |
| 3,951,059 | 4/1976 | Morris | 241/99 X |
| 4,076,979 | 2/1978 | Walter et al. | 209/580 X |
| 4,113,185 | 9/1978 | Marsh et al. | 241/DIG. 38 X |
| 4,139,454 | 2/1979 | Larson | 241/81 X |
| 4,153,206 | 5/1979 | Haefner et al. | 241/99 X |
| 4,248,388 | 2/1981 | King | 241/99 |

*Primary Examiner*—Mark Rosenbaum
*Assistant Examiner*—Frances Chin
*Attorney, Agent, or Firm*—McAulay Fisher Nissen Goldberg & Kiel

[57] ABSTRACT

Manipulating and selecting unit for recycling pressed or unpressed bodies obtained from plastic material containers as well as others, having a hopper for receiving containers to be processed and for conveying the containers to a cleanser for cleaning the containers and separating pressed from unpressed containers and conveying the pressed containers to a receiver and the unpressed containers to a squeezer or flattener for pressing the unpressed containers and applying to the receiver; a separation is coupled with the hopper for receiving pressed containers and separating them according to color and type of material; and then selecting and determining the type of recovered pressed containers, and forwarding the pressed containers to a processor in accordance with the type of material, whether plastic or not, and the color.

18 Claims, 4 Drawing Sheets

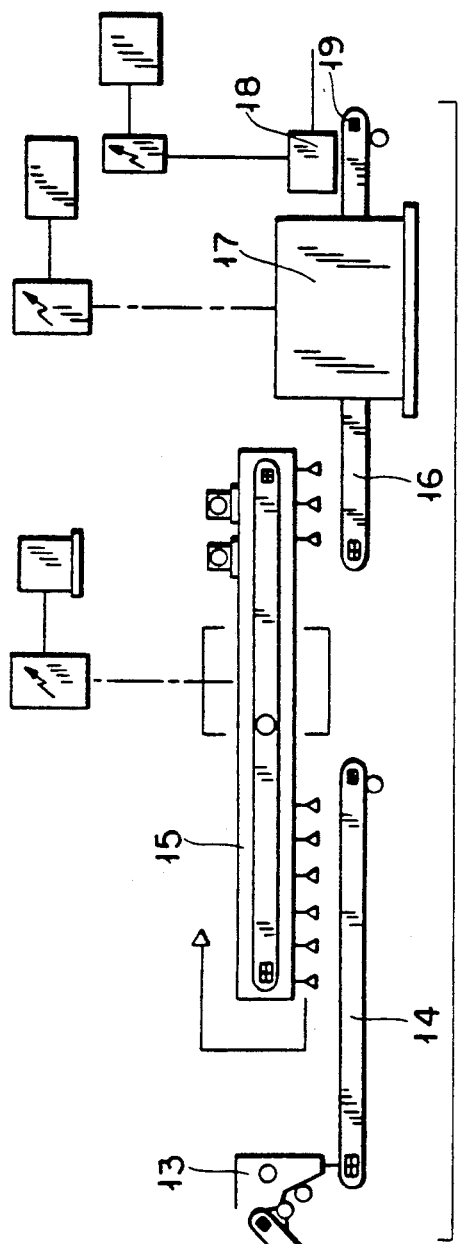
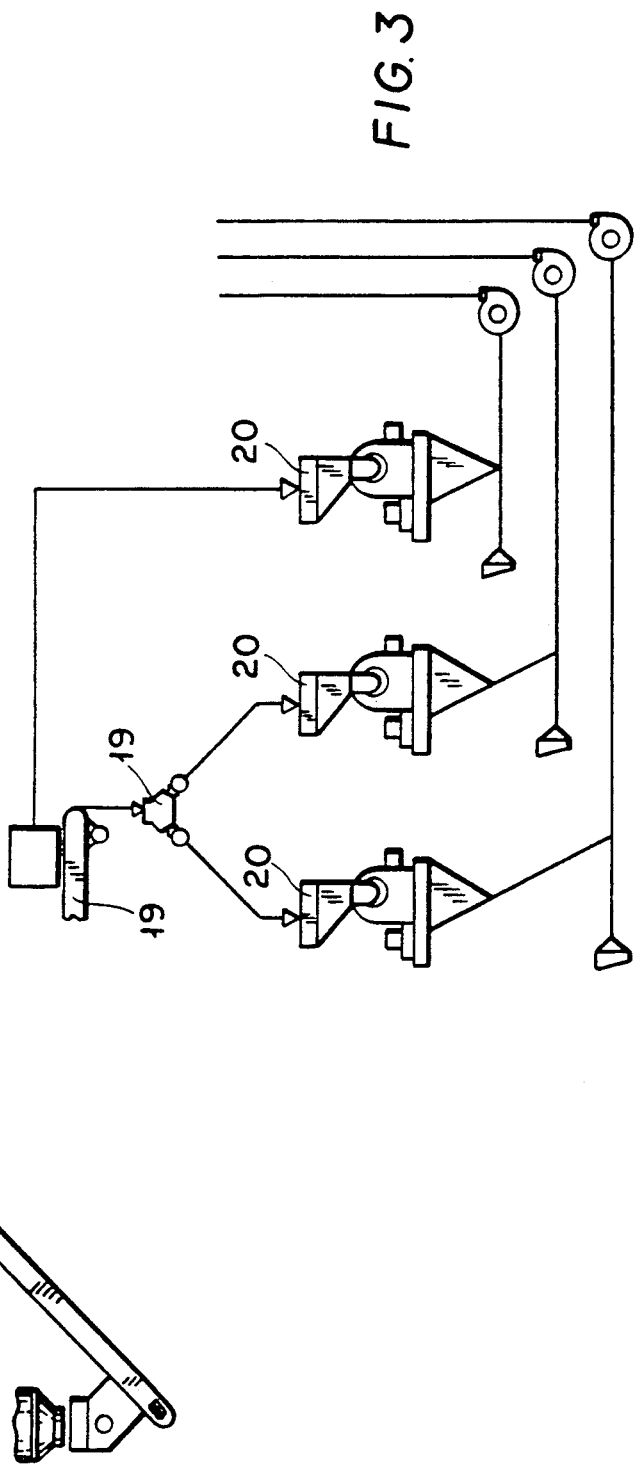
FIG. 2
FIG. 3

MANIPULATING AND SELECTING UNIT FOR RECYCLING PRESSED OR UNPRESSED BODIES OBTAINED FROM PLASTIC MATERIAL CONTAINERS OR OTHERS

BACKGROUND OF THE INVENTION

In order to protect the environment and surrounding areas and to avoid an excess amount of waste material, various waste material recovery systems and procedures have been placed into operation. More particularly, this invention is concerned with the recovery of waste material as a result of recycling of empty containers formed of plastic materials.

The present invention has its major applicability for use in centers which are concerned with the distribution of food and other related items. At such distribution centers, the necessity for the collection of empty used containers such as bottles, cans and similar items are to be taken into account and, in particular, the necessity for the distribution center having such recovery systems of providing a renewed supply of the same product.

SUMMARY OF THE INVENTION

It is an object of the invention to provide for a waste recovery system which can be used in connection with empty containers which have already been pressed as well as those containers which require pressing or flattening.

The invention finds its primary applicability in those operations which permit the use of the system either before the recycling phase or subsequent thereto to carry out a preliminary selection of empty containers or after the squeezing phase, so that one can work on the recovered containers or bodies or by conjointly operating the treatment on both types of bodies.

The equipment uses initial loading devices for collection bags as well as for cleaning, to separate recovered bodies from their plugs. These bodies arrive from a receiver and subsequently are brought to a dosing device, after which they reach a manipulator which transfers them onto a sector belt conveyor. The body then reaches some stations having the capability of recognizing the type and color of the plastic material. Therefore, it is possible to provide for different groups of processed containers formed from a homogenous composition of the material which has been differently selected and can then be directly used again after appropriate sterilization.

Other objects and advantages of the nature of the invention will become readily apparent from a detailed description of the invention taken in connection with the accompanying drawings.

BRIEF DESCRIPTION OF THE DRAWINGS

FIG. 2 is a further portion of the system following the portion shown in FIG. 1 for separation of the containers in accordance with their color and type of plastic materials;

FIG. 3 is a part of a system following the portion shown in FIG. 2 as well as a further amplification of a portion of FIG. 2 showing different types of grinding mills for use with different types and colors of plastic container bottles;

DESCRIPTION OF THE PREFERRED EMBODIMENTS

Figure 1:
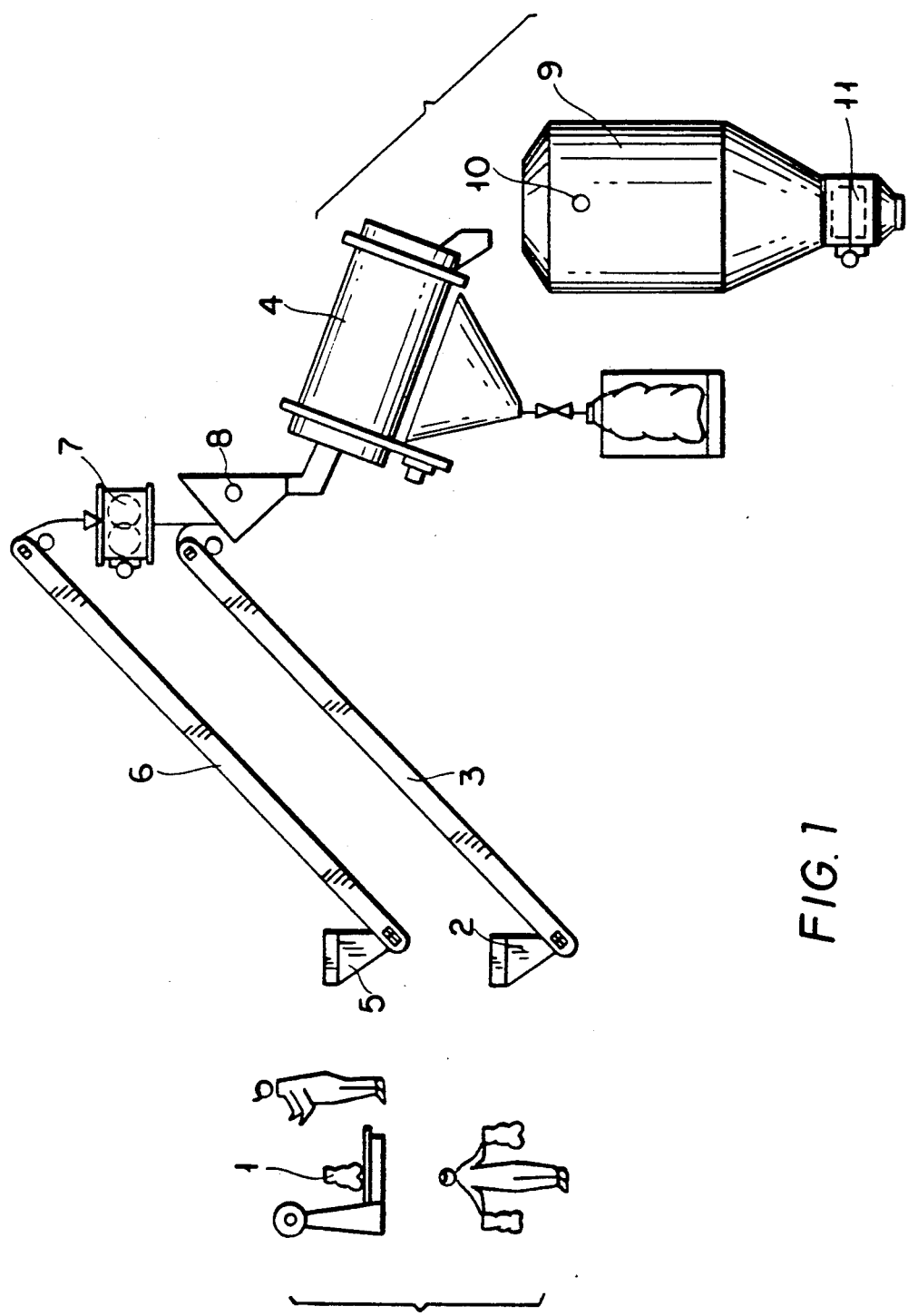
FIG. 1 is a schematic layout of a portion of the system, specifically illustrating compartments for loading, cleaning and stocking of plastic containers of the bottle type and, if necessary, further squeezing the plastic containers into a flattened condition.

Referring now more particularly to FIG. 1 of the drawings which shows the best mode for carrying out the invention, an individual I is shown carrying bags B of containers 1 which are to be processed and, subsequent thereto, the individual is shown proximate to a scale or weighing mechanism and one of the bags is placed onto a loading platform 1a so that the containers can be placed into either hopper 2 or hopper 5 for segregation. Hopper 2 is used for those containers which have been previously pressed, and hopper 5 is for those containers which have not previously been pressed.

After the previously pressed material or containers are placed into hopper 2, it is conveyed by means of a conveyor line 3 to a cleaning device generally indicated as a rotating drum 4 to separate pressed from non-pressed plugs or containers. After the supposedly previously pressed plugs or containers and material are conveyed by line 3 to hopper 8 for feeding into cleaning device 4, they are moved to a further cleaning device 4a. Those that are completely pressed and are subjected to the cleaning device 4 move out of cleaning device 4 through discharge opening 4c and are conveyed to receiver 9. Those plugs or materials or containers which are not completely pressed after being cleaned in the cleaning device 4a are then placed into bags B at 4b and conveyed to hopper 5 for further processing. Hopper 5 then moves the partially processed and partially squeezed and unsqueezed containers along conveyor belt 6 to squeezing rollers 7. Squeezing rollers 7 then feed the squeezed containers at the output thereof to hopper 8 whereat they join containers being supplied from conveyor 3 after which they go through cleaning device 4 again and then exit through output 4c.

Receiver 9 is fitted with a high level bearing circle 10. By means of a volumetric dosing device 11, transportation or conveyor line 12 (FIG. 2) is fed.

Referring now more particularly to FIG. 2, volumetric dosing device 11 (partially shown) discharges the processed plugs into a hopper 12a which is connected with transportation or conveyor line 12. The plugs are conveyed by transportation line 12 to vibrating alignment hopper 13 which aligns the bottles or containers in their squeezed conditions according to their longest size and places or conveys them onto conveyor line 14. Conveyor line 14 moves the bodies towards and brings them to manipulator 15 fitted with turning suction cups 15a for holding the pressed containers and holding them in a lengthwise condition, which transfers the pressed, singularized and trimmed bodies onto sector ribbon 16. The containers are passed through electromagnetic wave emitting device 15b which is responsive to and feeds information bout the containers into position detecting station 15c which rotates the containers based on information applied thereto from computerized control manipulation system 15d. The container body which is now in its pressed and trimmed condition is then conveyed through two detecting stations, station 17 to detect containers of plastic type material, and station 18 to detect the color. Switching device 19 (as seen in FIGS. 2 and 3) is fed by both detectors 17 and 18 and, according to the type of plastic material and its color, the pressed body is diverted and kept separate according to color or non-color by switching device 19 and conveyed to one of a number of different grinding mills 20, as best seen in FIG. 3. Each mill 20a, 20b and 20c, is fitted with a device for the load's pneumatic transport on the fixed and mobile storage means. One, such as the metal containers, either goes directly to grinding mill 20a or, if it is a plastic container, it is fed to a deflector device 19a for feeding to either mill 20b or mill 20c, according to whether it is colored or not.

Plastic containers are conveyed to deflector device 19a which maintains the colored plastic containers separate from the non-colored plastic containers for conveyance to mills 20b and 20c. The metal containers are conveyed by means of conveyor line 39 to mill 20a.

Figure 4:
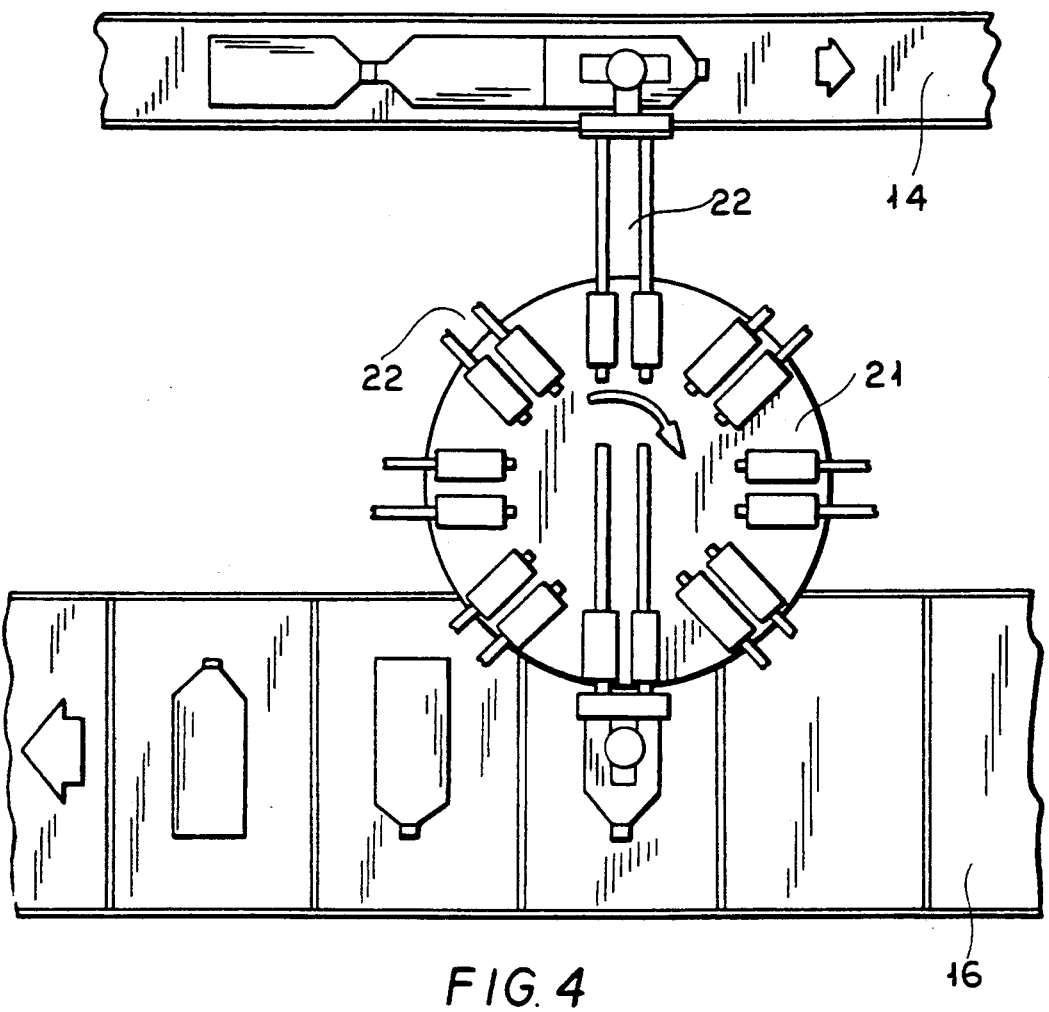
FIG. 4 is a view from the top of FIG. 2 showing additional portions of the system and further elements not shown in FIG. 2, and illustrating the manipulation of suction cups and movement of the containers from one conveyor to another.
Figure 5:
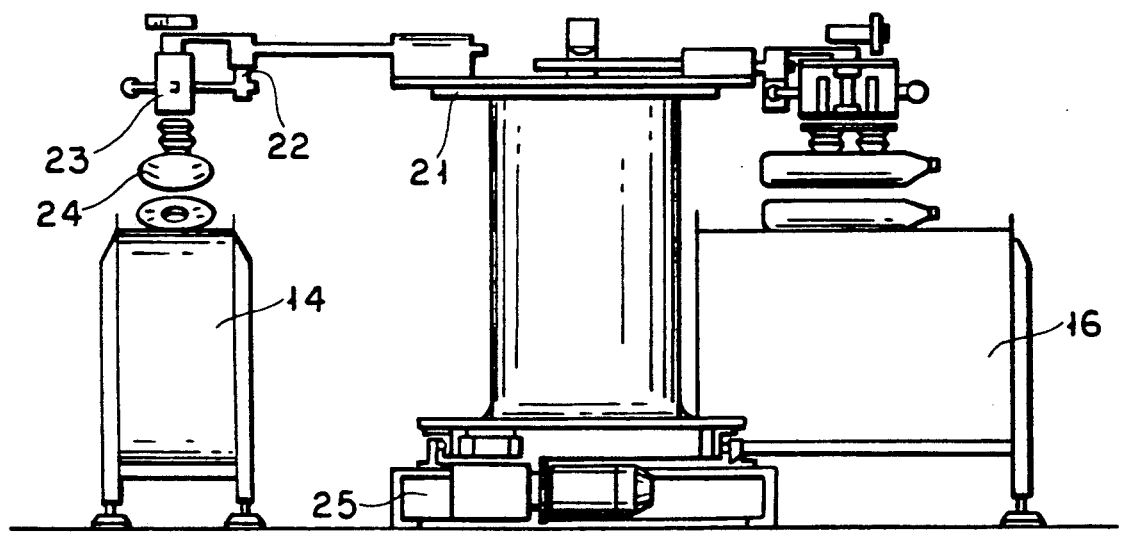
FIG. 5 is a side view of a motorized assembly.

Referring now to FIGS. 4 and 5, the whole proceeding is checked by a computerized system, and manipulator 15 is fitted with turning suction cups 15a and consists of turning table 21 which turns in synchronism with conveyor lines 14 and 16. Arms 22 on turning table 21 are shifted radially into the captation zone above conveyor 14 and suction cup holders 23 with suction cups 15a which are lowered to draw pressed body 24 (see FIG. 4) and place it onto ribbon 16 after a 180° rotation. A suitable motor reducer 25 is coupled to turning table 21 for rotation thereof.

As best seen in FIG. 5, the pressed container 24 is in one position after it is picked up from sector ribbon 14 and, while turntable 2 rotates 180°, the pressed container is dropped onto sector ribbon 16. In FIG. 5, the containers on ribbon 16 are oriented orthogonally to their position on sector ribbon 14.

On ribbon 14, the containers are laid out so that alternate neck portions and base portions are in contact with each other and, on ribbon 16, the base and neck portions of adjacent containers are 180° displaced from each other.

Figure 6:
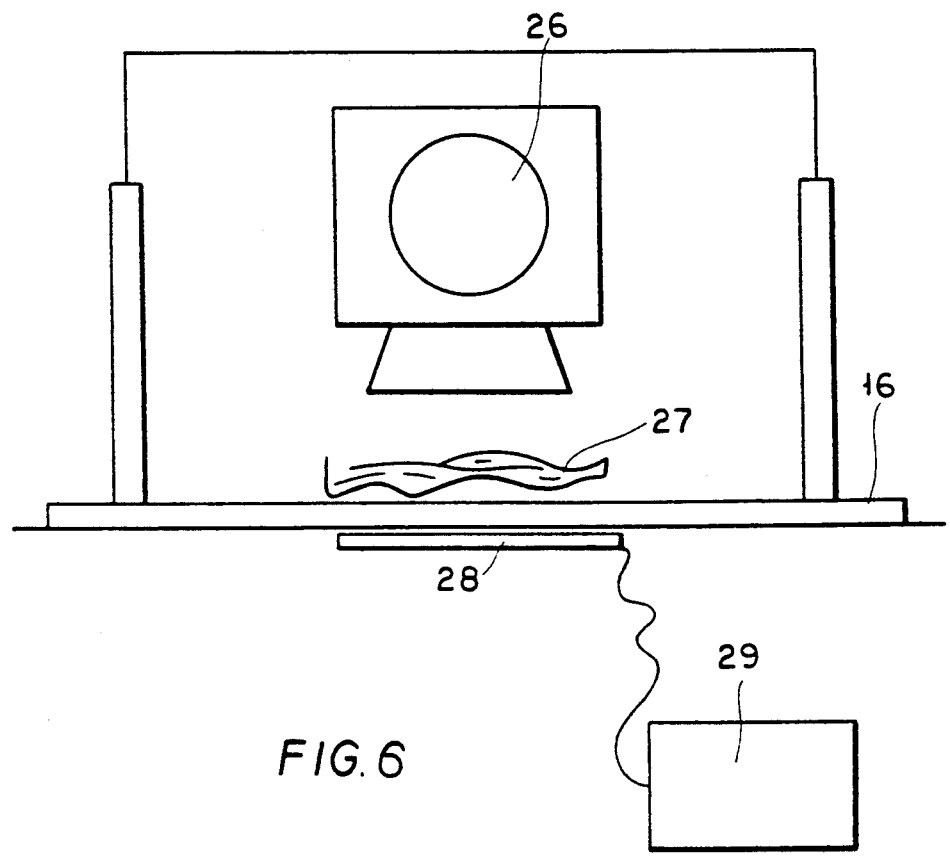
FIG. 6 is a front view and detailed showing of a recognition device for the squeezed plastic materials and showing in detail an emitter of appropriate electromagnetic waves with reference to the pressed body.

Referring now to FIG. 6, which schematically shows electromagnetic wave emitting device 26 proximate to conveyor line 16 in the form of the sector ribbon. On the passage of pressed body 27, wave emitting device 26 subsequently emits a beam of electromagnetic waves for reception by sensor 28 which is fitted below sector ribbon or conveyor 16 ad on the other side of pressed body 27. Computerized system 29 analyzes the quality of the waves and the system includes a computerized statistic system for establishing the nature and type of the plastic material and controls its deviation on the relevant line for subsequent treatment. The unit also uses a selecting and reading device 30 for selecting and determining the recovered squeezed bodies formed of plastic material which are selected according to the color. This enables the separation of the squeezed bodies or pressed containers in different colors with an economical advantage for the quality of the recovered product. This device uses a reading device in selecting and reading device 30 for analyzing the shape of pressed containers or body 31 and, on points fixed in advance, estimates the frequency of the electromagnetic waves emitted by this body or container and, consequently, evaluates its color. This last analysis is carried out by means of electronic sensors which establish the color of the body; for this operation, a neutral source 32 is fitted below the sliding plane of conveyor line 16.

DESCRIPTION OF OPERATION OF THE INVENTION

The manipulation and selection unit is used for the recycling of body units obtained from whole or pressed bodies which require further sorting or squeezing by squeezing rollers 7.

To facilitate the sorting and processing and to expedite matters, two different lines are provided to form a segregation means, one for those bodies which have already been pressed, and another for those which require squeezing and must go through a squeezing and pressing operation or those which may require a further pressing and squeezing operation. Both lines can be supplied from a single source and then separated and then the recovered bodies, can all be supplied to a single hopper for subsequent treatment after the bodies are all in the same squeezed and pressed condition.

The operational cycle, concerning the separation of already squeezed bodies from the plugs, at the beginning of the line, includes introducing squeezed material or containers 1 which are contained in bags B into a hopper 2 and then onto a first transport line 3 to a cleaning device 4a fitted with turning drum 4 which separates the squeezed from the non-squeezed containers as well as those containers requiring additional squeezing, and then turning drum 4 passes the non-squeezed plugs to cleaning device 4a and then to a temporary storage container 4b to separate these bodies from the squeezed containers.

The non-squeezed containers or plugs or those requiring further squeezing are then taken from temporary storage container 4b and placed into hopper 5, after which they are conveyed by means of conveyor belt or line 6 to a container squeezing mechanism 7, generally comprising at least one pair of squeezing rollers primarily intended for squeezing of plastic containers. After passing through squeezing rollers 7, the processed containers which have now been squeezed are fed to hopper 8, and these containers are now in the same condition.

The recovered bodies coming from two treatment lines or conveyors 3 and 6 fall through hopper 8 onto turning drum 4 as heretofore, and those which are already squeezed are sent to receiver 9 which is fitted with a high level bearing circle 10. Volume dosing device 11 feeds the squeezed containers to a conveyor transport line 12 (FIG. 2) which puts the bodies into vibrating alignment hopper 13 for discharging the squeezed bodies and aligning them according to their larger side so that the containers are all aligned in the same way on another conveyor transport line 14. This line 14 then conveys the bodies towards manipulator 15 which is provided with a turning mechanism for turning the suction cups 15a and which individually transfers the containers onto ribbon 16, and the manipulator 15 also includes a tilting device for the containers while singularizing each one of the containers and tilting them before transferring them onto sector ribbon 16. The bodies are then passed through two recognizing or identification stations 17 and 18. Station 17 is used for recognition of plastic type containers, and the other station 18 is used for the recognition of color. The containers not made of plastic are then conveyed to mill 20a, and the plastic containers are conveyed to double deflector device 19a. According to the recognized type of the plastic material and to its color, they are switched by switching device 19 to double deflector device 19a or directly to grinding mill 20a (FIG. 3) to different grinding mills 20b and 20c, each of which is fitted with a pneumatic transporter for the fixed and mobile stockage means all checked by a computerized system.

Figure 7:
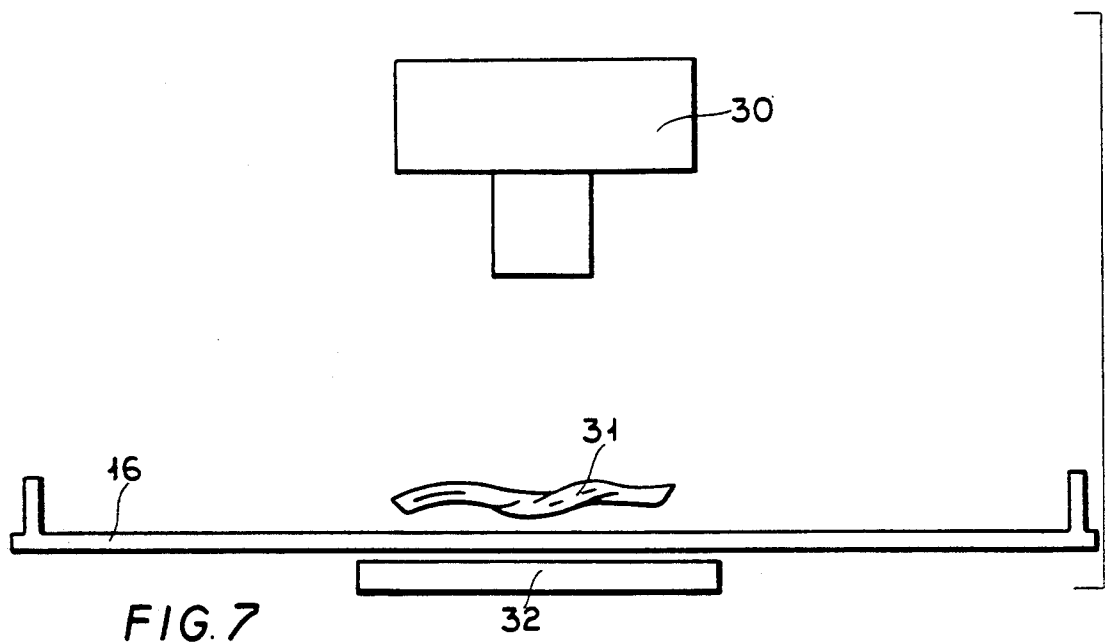
FIG. 7 is a view similar to FIG. 6 of another recognition portion of the apparatus to recognize and select the color and, for this purpose, a reading device 30 is provided together with a neutral source in order to check the color of the pressed body.

The detector station 18 is coupled with a reading device 30 which includes a computer system responsive to a sensor at the detecting station capable of further distinguishing between light colored and dark colored bottles. If desired, a separate mill (not shown) may be used for the non-plastic containers and grinding mill 20a may be used for dark plastic containers. The dark colored plastic bottles or containers may, for example, be fed through line 39 to the hopper of grinding mill 20a. For this purpose, conveyor belt 16, as shown in FIG. 7, with the pressed body or container 31 being conveyed thereby between reading device 30 and neutral light source 32 shown below the plane of conveyor 16. Analysis of the color received by reading device 30 from light source 32 is made by the computer system 30 for facilitating separation by color.

Belt or ribbon conveyors 14 and 16 carrying turning suction cups manipulator 15 are used with turning table 21. A plurality of drawing arms 22 are carried by turning table 21 and extend to cup holder 15a for removal of a bottle or container from conveyor 14. Table 21 rotates through an angle of 180° and places the container in an appropriate position onto conveyor 16, which is shown as moving (FIG. 4) in direction opposite to conveyor 14. The containers go from a first position to a second position oriented differently from the first position.

Turning table 21 turns in synchronism with belt conveyors 14 and 16. Drawing arms 22, fitted on the table 21, are radially displaced in the captation zone above the first belt conveyor 14. Suction cup holders 23 are then lowered to grip squeezed body 24 and lay it down onto second sector belt conveyor 16 after a 180° rotation by means of motor reducer 25.

Station 17 for determining the type of plastic is coupled with an electromagnetic energy emitting device 26, sensor 28 and detecting system 29.

Observation station 17 comprises both emitting device 26 which, on the passage of the squeezed body 27 (FIG. 6), emits a beam of electromagnetic waves of suitable length and sensor 28 fitted under sector belt conveyor 16 which picks up those electromagnetic waves after they have crossed the body. Sensor 28 is connected with detecting system 29 which, after having examined the features of the received electromagnetic waves, is capable of establishing the kind of plastic material and, therefore, to address or send the body to the relevant treatment line and directs it to grinding mill 20b or 20c.

While there has been shown what is considered to be the preferred embodiments of the invention, various changes and modifications may be made therein without departing from the scope of the invention.

I claim:

1. Manipulating and selecting unit for recycling bodies obtained from containers of different material, comprising:

hopper means for receiving containers to be processed and means for conveying the containers to cleaning means for cleaning the containers and separating pressed from unpressed containers and conveying the pressed containers to a receiver and the unpressed containers to squeezing means for pressing the unpressed containers and applying to said receiver the previously unpressed containers after pressing to combine them with the previously applied pressed containers sent to said receiver;

separation means coupled with said hopper means for receiving pressed containers and separating them according to color and type of material; and selection and reading means for selecting and determining recovered pressed containers, and forwarding to a processor in accordance with the type of material and the color;

said hopper means comprising a first hopper for receiving containers previously pressed and a second hopper for receiving previously unpressed containers and not applied to said receiver by said first hopper and conveying said unpressed containers to said squeezing means, said squeezing means comprising squeezing rollers for squeezing the unpressed containers and conveying them after squeezing to form pressed containers to said receiver for co-mingling with the previously pressed containers conveyed by said first hopper to said receiver and retained by said receiver; and said separation means including a first conveyor and a vibrating alignment hopper for alignment of said pressed containers in their squeezed condition and according to their size and a second conveyor line to transport the pressed containers to manipulator means provided with suction cups for holding said containers for transfer thereof onto a sector ribbon for conveyance according to color and material for sorting in accordance with color and material, and detecting and separation means for separation of the containers according to color and type of material.

2. The unit of claim 1, wherein said separation means includes means for separation of said squeezed containers according to size and color.

3. The unit of claim 1, wherein said color and material separation and detecting means comprises first and second detecting stations for detecting the type of material and color of material respectively, and switching means coupled with said first and said second detectors and at least three grinding mills, a first for a plastic container of color, a second for a plastic container of no color, and a third for non-plastic containers.

4. The unit of claim 3, wherein said manipulator means includes a turning table between said sector ribbon and another conveyor line in the form of a second sector ribbon, said suction cups pick up a pressed container and transfers the pressed container onto said second sector ribbon after a 180° rotation.

5. The unit as claimed in claim 4, wherein said selection and reading means includes a reading device for analyzing the shape of the pressed containers, said reading device evaluating the color based on the frequency of electromagnetic waves emitted and thereby evaluates the color of the container.

6. The unit of claim 1, wherein said manipulator means includes a turning table between said sector ribbon and another conveyor line in the form of a second sector ribbon, said suction cups pick up a pressed container and transfers the pressed container onto said second sector ribbon after a 180° rotation.

7. The unit as claimed in claim 6, wherein said manipulating means includes a turning device cooperating with said suction cups for turning the orientation of the containers before placement onto said second sector ribbon.

8. The unit as claimed in claim 1, wherein said selection and reading means includes a reading device for analyzing the shape of the pressed containers, said reading device evaluating the color based on the frequency of electromagnetic waves emitted and thereby evaluates the color of the container.

9. The unit as claimed in claim 8, including a neutral source forming part of said separation means positioned proximate to said reading device with the pressed containers being conveyed therebetween.

10. The unit as claimed in claim 1, including segregation means comprising two separate lines, one for pressed containers and another for unpressed containers, both of said lines being supplied from a single source.

11. The unit of claim 1, wherein said separation means includes a first conveyor and a vibrating alignment hopper for alignment of said pressed containers in their squeezed condition and according to their size and a second conveyor line to transport the pressed containers to manipulator means provided with suction cups for holding said containers for transfer thereof onto a sector ribbon for conveyance to color and material detecting and separation means for separation of the, containers according to color and type of material.

12. The unit as claimed in claim 7, wherein said separation means includes means for separating the pressed containers as between plastic and non-plastic pressed containers and as between light colored and dark colored plastic containers.

13. Manipulating and selecting unit for recycling different container bodies, comprising:
hopper means for receiving containers to be processed and means for conveying the containers to cleaning means for cleaning the containers and separating pressed from unpressed containers and conveying the pressed containers to a receiver and the unpressed containers to squeezing means for pressing the unpressed containers and applying to said receiver the previously unpressed containers after pressing to combine them with the previously applied pressed containers sent to said receiver;
separation means coupled with said hopper means for receiving pressed containers and separating them according to size, color and type of material, said separation means including a first conveyor and a vibrating alignment hopper for alignment of said pressed containers in their squeezed condition and according to their size and a second conveyor line to transport the pressed containers to manipulator means provided with suction cups for holding said containers for transfer thereof onto a sector ribbon for conveyance according to color and material for sorting in accordance with color and material, and detecting and separation means for separation of the containers according to color and type of material; and
selection and reading means for selecting and determining recovered pressed containers, and forwarding to a processor in accordance with the size, the type of material and the color.

14. The unit of claim 13, wherein said hopper means comprises a first hopper for receiving containers previously pressed and a second hopper for receiving previously unpressed containers and not applied to said receiver by said first hopper and conveying said unpressed containers to said squeezing means, said squeezing means comprising squeezing rollers for squeezing the unpressed containers and conveying them after squeezing to form pressed containers to said receiver for co-mingling with the previously pressed containers conveyed by said first hopper to said receiver and retained by said receiver.

15. The unit as claimed in claim 13, wherein said selection and reading means includes a reading device for analyzing the shape of the pressed containers, said reading device evaluating the color based on the frequency of electromagnetic waves emitted and thereby evaluates the color of the container.

16. The unit as claimed in claim 15, including a neutral source forming part of said separation means positioned proximate to said reading device with the pressed containers being conveyed therebetween.

17. The unit as claimed in claim 13, wherein said separation means includes two separate lines, one for pressed containers and another for unpressed containers, both of said lines being supplied from a single source.

18. The unit as claimed in claim 13, wherein said separation means includes means for separating the pressed containers as between plastic and non-plastic pressed containers and as between light colored and dark colored plastic containers.

* * * * *